US008872666B2

(12) United States Patent
Klute

(10) Patent No.: US 8,872,666 B2
(45) Date of Patent: Oct. 28, 2014

(54) TRAP FOR SMALL ANIMALS

(76) Inventor: Oliver Klute, Altenbeken (DE)

( * ) Notice: Subject to any disclaimer, the term of this patent is extended or adjusted under 35 U.S.C. 154(b) by 535 days.

(21) Appl. No.: 12/918,088

(22) PCT Filed: Feb. 26, 2009

(86) PCT No.: PCT/EP2009/001378
§ 371 (c)(1),
(2), (4) Date: Aug. 18, 2010

(87) PCT Pub. No.: WO2009/109328
PCT Pub. Date: Sep. 11, 2009

(65) Prior Publication Data
US 2010/0321188 A1 Dec. 23, 2010

(30) Foreign Application Priority Data
Mar. 6, 2008 (DE) ..................... 20 2008 003 216 U

(51) Int. Cl.
*G08B 23/00* (2006.01)
*A01M 23/00* (2006.01)
*A01M 31/00* (2006.01)
*A01M 23/10* (2006.01)
*A01M 23/12* (2006.01)

(52) U.S. Cl.
CPC ............. *A01M 31/002* (2013.01); *A01M 23/10* (2013.01); *A01M 23/12* (2013.01)
USPC .......................................... 340/573.2; 43/60

(58) Field of Classification Search
USPC ........ 43/1–2, 58–111; 340/573.2, 541–545.7, 340/686.1–687, 539.1, 693.1
See application file for complete search history.

(56) References Cited

U.S. PATENT DOCUMENTS

| 1,510,346 | A | | 9/1924 | Smith |
|---|---|---|---|---|
| 1,758,952 | A | * | 5/1930 | Kness ................. 43/74 |
| 3,781,836 | A | * | 12/1973 | Kruper et al. ............. 340/539.3 |
| 4,253,264 | A | | 3/1981 | Souza |
| 4,641,456 | A | * | 2/1987 | Boharski ........................ 43/73 |
| 5,499,013 | A | * | 3/1996 | Konotchick ............. 340/539.22 |
| 5,511,339 | A | | 4/1996 | Pencheon |
| 6,016,623 | A | | 1/2000 | Celestine |
| 6,125,576 | A | * | 10/2000 | Knuppel ........................ 43/74 |
| 6,202,340 | B1 | * | 3/2001 | Nieves ........................ 43/61 |
| 6,230,434 | B1 | * | 5/2001 | Knuppel ........................ 43/74 |
| 6,445,301 | B1 | * | 9/2002 | Farrell et al. ............... 340/573.2 |
| 6,597,949 | B1 | * | 7/2003 | Dhurjaty ........................ 607/5 |
| 6,807,767 | B1 | * | 10/2004 | Schade ........................ 43/77 |
| 7,026,942 | B2 | * | 4/2006 | Cristofori et al. ........... 340/573.2 |
| 2002/0184811 | A1 | * | 12/2002 | Wright ........................ 43/58 |
| 2003/0093954 | A1 | * | 5/2003 | Willats et al. ................... 49/279 |

(Continued)

FOREIGN PATENT DOCUMENTS

DE 177782 5/1906
DE 29713653 U1 10/1997

(Continued)

*Primary Examiner* — Hai Phan
*Assistant Examiner* — Royit Yu
(74) *Attorney, Agent, or Firm* — Richard M. Goldberg

(57) ABSTRACT

A trap for small animals, includes a trigger mechanism (26) to be triggered by an animal that is trapped, and a transmitter (42) actuated by the trigger mechanism for transmitting a detection signal to a monitoring center, the detector including a mechano-electrical transducer (44) that is driven by the trigger mechanism (26) and the energy of which powers the transmitter (42).

4 Claims, 3 Drawing Sheets

(56) References Cited

U.S. PATENT DOCUMENTS

| | | |
|---|---|---|
| 2003/0213161 A1* | 11/2003 | Gardner et al. ............... 43/61 |
| 2003/0218541 A1* | 11/2003 | Sakai ..................... 340/545.1 |
| 2004/0025410 A1* | 2/2004 | Shapland ..................... 43/65 |
| 2004/0085224 A1 | 5/2004 | Weiss et al. |
| 2005/0097808 A1* | 5/2005 | Vorhies et al. ............... 43/61 |
| 2006/0042153 A1* | 3/2006 | Bowerman ................... 43/61 |
| 2007/0080814 A1* | 4/2007 | Ellsworth et al. ......... 340/573.1 |
| 2007/0124020 A1* | 5/2007 | Staples ..................... 700/229 |
| 2007/0173172 A1* | 7/2007 | Yu et al. ................... 446/303 |
| 2007/0245617 A1 | 10/2007 | Deibert |
| 2008/0125006 A1* | 5/2008 | Yu et al. ................... 446/298 |
| 2008/0204253 A1* | 8/2008 | Cottee et al. ............. 340/573.2 |
| 2009/0151221 A1* | 6/2009 | Daley ........................ 43/58 |
| 2009/0205244 A1* | 8/2009 | Pomerantz .................. 43/61 |
| 2010/0210320 A1* | 8/2010 | Waller ...................... 455/573 |

FOREIGN PATENT DOCUMENTS

| | | |
|---|---|---|
| DE | 202004013928 U1 | 1/2006 |
| FR | 2630884 A | 11/1989 |
| GB | 2404904 A | 2/2005 |

* cited by examiner

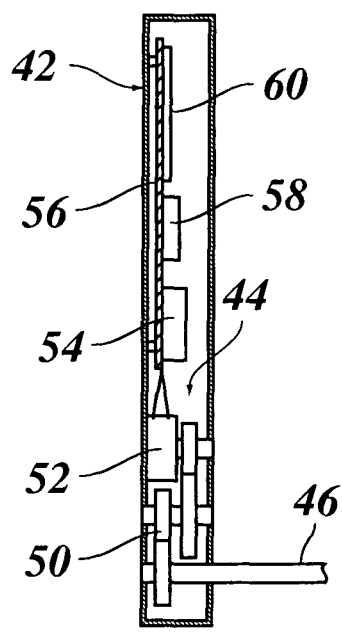
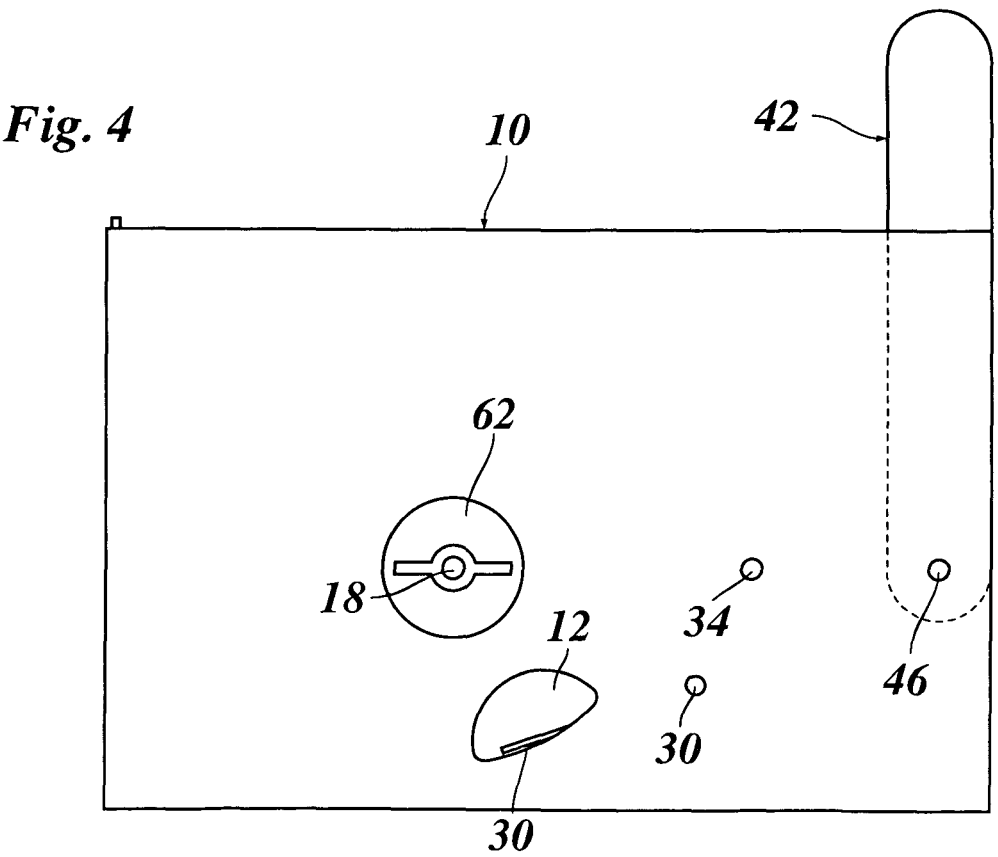

TRAP FOR SMALL ANIMALS

BACKGROUND OF THE INVENTION

The invention relates to a trap for small animals, comprising a trigger mechanism to be triggered by an animal that is trapped, and a transmitter actuated by the trigger mechanism for transmitting a detection signal to a monitoring centre.

DE 20 2004 013 928 describes a trap of this type. When an animal actuates the trigger mechanism, it will be caught in the trap. In case of a life trap, it must be assured that the animal is attended to in reasonable time so as to prevent the animal from unduly suffering or starving in the trap. The transmitter has the purpose to send an alarm signal to the monitoring centre so as to alert the personnel in the monitoring centre to free the animal from the trap.

SUMMARY OF THE INVENTION

It is an object of the invention to provide a trap that can be installed in arbitrary places, regardless of whether or not an electrical power net is available, and which functions with high reliability and requires only little maintenance effort.

In order to achieve this object, according to the invention, the trap comprises a mechano-electrical transducer that is driven by the trigger mechanism and the energy of which powers the transmitter.

Mechano-electrical transducers are known per-se, for example in the form of dynamos, piezoelectric transducers and the like, and they have been used among others in theft protection systems. FR 2 630 884 A describes a transducer that is driven by a movement of an animal (dog) and generates electric energy. In the trap according to the invention, such a transducer provides the electric energy that is needed for powering the transmitter. The mechanical energy for driving the transducer is provided by the trigger mechanism. Thus, it is assured that the transmitter will be supplied with energy and will be ready to operate whenever an animal has been detected and a corresponding detection signal or alarm signal is to be sent to the monitoring centre.

The autonomous power supply for the transmitter has the advantage that no electrical power network needs to be available at the place where the trap is to be installed, and no batteries are needed, neither, so that costs for obtaining the batteries, checking the load condition thereof and for disposing used batteries can be avoided.

More specific optional features of the invention are indicated in the dependent claims.

The trap may be used just for small animals, especially pest, such as mice, rats and the like.

The trigger mechanism may be so configured that the weight or the movements of the animal are utilised for providing the mechanical energy for driving the transducer. In case of a life trap, it may however be preferable that the trigger mechanism is pre-loaded mechanically by means of a power reservoir, e.g. a spring. In that case, the energy of the power reservoir may be used for driving the transducer and hence for operating the transmitter. Since the trap must be visited by the personnel, anyway, in order to free the trapped animal, it does hardly require any additional effort if the personnel loads the trigger mechanism on that occasion, so that the necessary energy will be stored for the next detection event.

Instead of powering the transmitter directly out of the mechano-electrical transducer, it is also possible to buffer the energy of the transducer in a rechargeable battery. This permits, for example, to equip the trap with a (GPS) receiver, thereby to enable a remote localisation of the trap and/or to transmit any action commands to the trap. The operating power for the receiver will then also be generated by the transducer.

Possibly, solar cells may be provided for additionally charging the battery. Then, the transducer will assure that, when the detection of an animal has to be signalled, a sufficient amount of energy will in any case be available, irrespective of the illumination condition of the solar cells.

BRIEF DESCRIPTION OF THE DRAWINGS

Embodiment examples of the invention will now be described in conjunction with the drawings, wherein:

FIG. 3 is a schematic cross-sectional view of a mechano-electrical unit of the trap;

FIG. 4 is a front view of the trap shown in FIGS. 1 and 2; and

DETAILED DESCRIPTION

Figure 1:
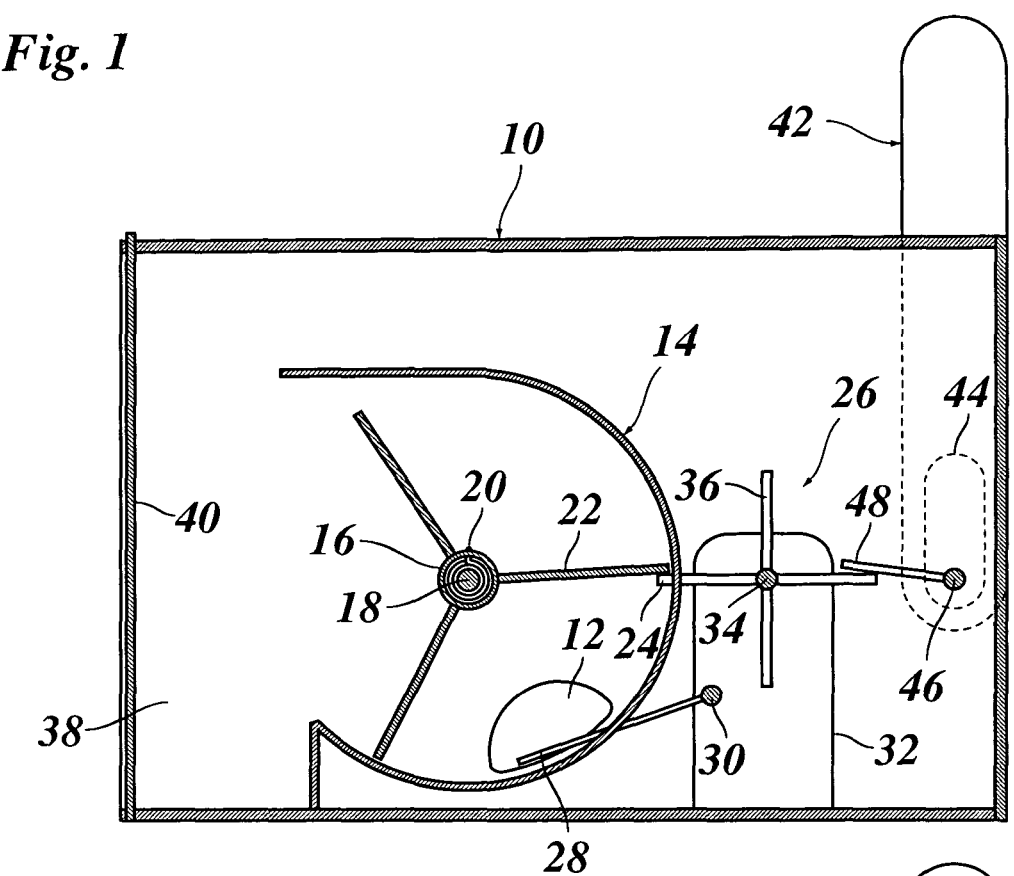
FIG. 1 shows a schematic cross-sectional view of a trap for small animals that embodies the present invention.

FIG. 1 shows an example of a life trap for small animals such as mice or other animals of similar size, which trap includes a detector. The trap has a box-shaped casing 10 but is penetrated by a tunnel 12 that extends in the direction normal to the plane of the drawing and through which a small animal to be trapped can creep through. Conveniently, the trap will be installed such that the animal is forced to pass through the tunnel 12 on its way to a nutrition source or the nest.

The tunnel 12 passes through a cellular wheel sluice 14 which, in the example shown, has a cellular wheel 16 with three arms 22 that is rotatably supported on an axle 18. The axle 18 is surrounded by a helical torsion spring 20 which, by means of a locking mechanism that has not been shown, is held in a pre-loaded state in which the cellular wheel 16 is biased in clock sense in FIG. 1. As long as the trap is not triggered, one arm 22 of the cellular wheel will however engage a stop 24 which passes through a slot in the peripheral wall of the sluice 14 and forms part of a trigger mechanism 26.

The trigger mechanism 26 further includes a trigger plate 28 that is mounted to be pivotable about a shaft 30 and also passes through a slot in the peripheral wall of the sluice 14 into the interior of the tunnel 12 in such a configuration that it forms part of the bottom of this tunnel. The shaft 30 is the input shaft of a step switch mechanism 32 that may be formed for example by a known ratchet mechanism and has an output shaft 34 that carries a cross with arms 36. One of the four arms of the cross forms the stop 24 for the arm 22 of the cellular wheel.

When an animal, e.g. a mouse, enters into the tunnel 12 and passes over the trigger plate 28, this plate will be tilted downwardly by the weight of the mouse, and the shaft 30 will be rotated accordingly. This causes an advance step of the step switch mechanism 32. In this step, the cross 36 is temporarily set free, so that the stop 24 will yield and the cellular wheel 16 can make a rotation in clock sense under the action of the spring 20. As a result, the mouse that has been present in the tunnel 12 will be caught by the arm 22 and, without being hurt, will be pushed into a space 38 from which it can be removed later after a sliding door 40 has been opened. The output shaft 34 having the arms 36 performs a 90° rotation and is then locked again by the ratchet mechanism in a position in which the next arm of the cross forms the stop 24, and when the cellular wheel 16 has performed a 120° rotation, the next arm of this wheel will be locked at the stop 24. Now, however, the spring 20 will largely be relaxed and must be tensioned again by the maintenance personnel in order for the trap to be ready to operate again.

Figure 2:
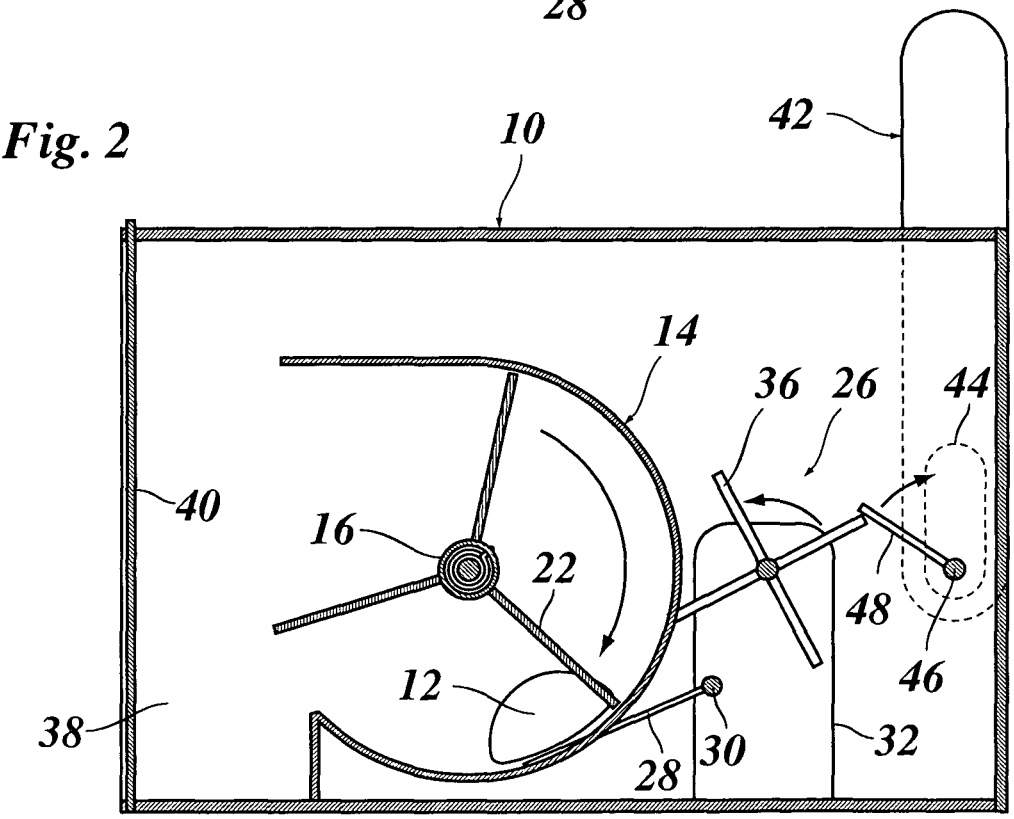
FIG. 2 is a sectional view of the trap shown in FIG. 1 in a triggered state.

The mechanical principle of the trap that has heretofore been known as such. The trap that is described here has the particular feature that a mechano-electrical unit 42 has been attached to the casing 10, this unit being configured to transmit a radio signal whenever the trap is triggered. To that end, the unit 42 includes a mechano-electrical transducer 44 that provides the electrical energy for generating the radio signal. A shaft 46 of the transducer 44 extends in parallel with the output shaft of the step switch mechanism 32 through the casing 10 and carries a lever 48 which engages one of the arms 36 of the cross in the condition shown in FIG. 1. When, now, the trap is triggered as shown in FIG. 2 and hence the cross is temporarily set free, the arm 22 of the cellular wheel will press down the arm 36 of the cross that has heretofore formed the stop 24, and the cross will rotate in counterclock sense. As a result, the opposite arm of the cross will pivot the lever 48 upwardly and will thereby cause a rotation of the shaft 46 which drives the mechano-electrical transducer 44.

In FIG. 3, the mechano-electrical unit 42 has been shown in a schematic cross-section. The transducer 44 comprises a gear box 50 having an input gear supported on the shaft 46 and an output gear driving a dynamo 52. The electric output terminals of the dynamo 52 are connected to a DC-converter 54 that is mounted on a circuit board 56. The circuit board 56 further carries a transmitter 58 that is formed by suitable electronics and is operated with the DC current provided by the converter 54, as well as an associated antenna 60.

As soon as the trigger mechanism 26 (FIGS. 1 and 2) causes the shaft 46 to rotate, the dynamo 52 provides an AC current which will be rectified and limited by the converter 54. As soon as the DC voltage generated by the converter reaches certain threshold value which corresponds at least to the operating voltage of the transmitter 58, this transmitter will be activated and send, via the antenna 60, a radio signal indicating that something has been trapped. This will cause the monitoring personnel to proceed to the trap in order to remove the mouse from the space 38. Simultaneously, the personnel will restore the ready-to-operate condition of the trap by loading the torsion spring 20 again.

FIG. 4 shows an external view of the casing 10. A rotary knob 62 is mounted on the axle 18 of the cellular wheel sluice outside of the casing 10, said knob being connected to one end of the torsion spring 20 via a detent that has not been shown. Thus, the rotary knob 62 permits to tension the torsion spring 20 until it has reached a certain bias, whereupon the above mentioned detent will release the spring which will then be held by another detent (not shown) in the biased position. In this way, the spring can be re-loaded by means of the knob 62 each time the trigger mechanism 26 has been actuated.

Figure 5:
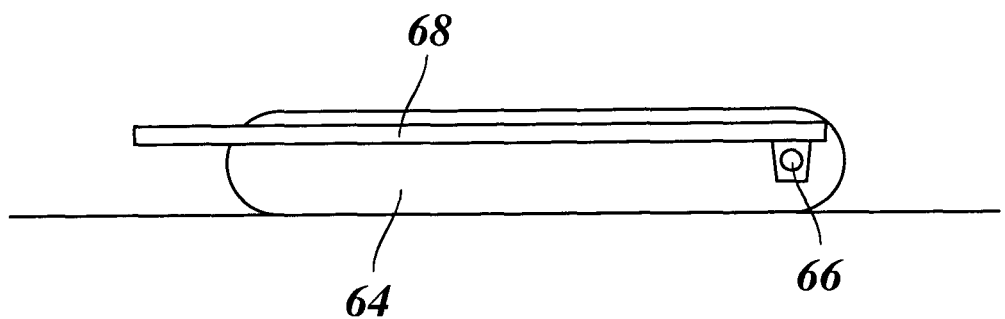
FIGS. 5 and 6 show a detector in a non-triggered and a triggered state.
Figure 6:
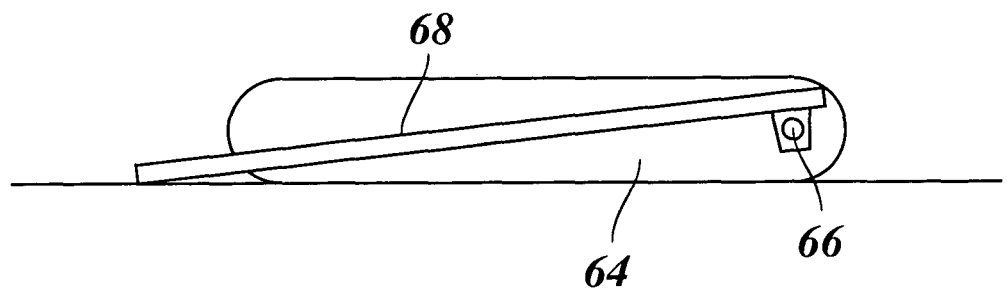

FIGS. 5 and 6 illustrate another embodiment of a trigger mechanism. A mechano-electrical unit 64 which may be identical with the unit 42 shown in FIG. 3 has an input shaft 66 that is rigidly connected to one end of a ramp plate 68, so that the ramp plate will freely project from the shaft 66 in a substantially horizontal direction in cantilever fashion. The shaft 66 may be subject to the force of a spring (not shown) which holds the ramp plate 68 in an essentially horizontal position.

When an animal steps onto the ramp plate 68, this plate will tilt into the position shown in FIG. 6, thereby causing a rotation of the input shaft 66. This slight rotation of the input shaft is sufficient for providing enough electrical energy for activating the transmitter and for sending a detection signal.

In a preferred embodiment, the transmitter will emit only a very short radio pulse which does not require much energy and will nevertheless be receivable by a suitable receiver at a distance of 50 to 1000 m from the location of the trap, depending on the presence of buildings or any another obstacles in the environment of the trap.

Thus, in this embodiment, the trigger mechanism does not need to be preloaded again after it has been triggered.

In a modified embodiment, a free end of the ramp plate 68 may rest on the floor (as shown in FIG. 6) when the detector is in the non-triggered state. In this embodiment, the other end of the ramp plate (on the right side in FIG. 6) would be drivingly connected to the input shaft 66 through a rack-and-pinion mechanism or the like, so that when an animal steps on the ramp plate 28, the upper end of the ramp plate 68, i.e. the end connected to the input shaft 66, will be pressed downward, possibly against the force of a weak return spring, so that the input shaft 66 will be driven to power the transmitter.

What is claimed is:

1. A trap for small animals, comprising:
   a movable element for trapping a small animal in the trap, the movable element being adapted to be driven by a power reservoir that is adapted to be pre-loaded manually,
   a trigger mechanism to be triggered by the small animal that is trapped,
   a transmitter for automatically transmitting a detection signal to a monitoring centre in response to triggering of the trigger mechanism by the animal,
   a mechano-electrical transducer that is caused to be driven in response to triggering of the trigger mechanism and which produces energy which powers the transmitter, a mechanical control device actuated by triggering of the trigger mechanism and which is in engagement with both:
     a) the movable element to move so as to trap the small animal, and
     b) the mechano-electrical transducer to produce said energy,
   the control device comprising a step switch mechanism having a shaft and at least one arm projecting therefrom, said shaft being rotated in each switching step of the step switch mechanism, and
   the mechano-electrical transducer comprises a shaft that extends in parallel with the shaft of the step switch mechanism and carries a lever arranged to be actuated by said at least one arm of the step switch mechanism,
   the movable element including a cellular wheel sluice that is biased by the power reservoir and is set free for rotation by the control device when triggered, and
   a tunnel permitting the small animal to pass through and leading through the cellular wheel sluice so that the animal will be pushed out of the tunnel into a closed space of the trap, while the sluice simultaneously drives the control device.

2. A trap according to claim 1, configured as a life trap.

3. A trap according to claim 1, wherein the step switch mechanism comprises a plurality of arms that are arranged equi-angularly and form a stop for arms of a cellular wheel of a cellular wheel sluice.

4. A trap according to claim 1, wherein the mechano-electrical transducer includes a dynamo.

* * * * *